Patented June 1, 1954

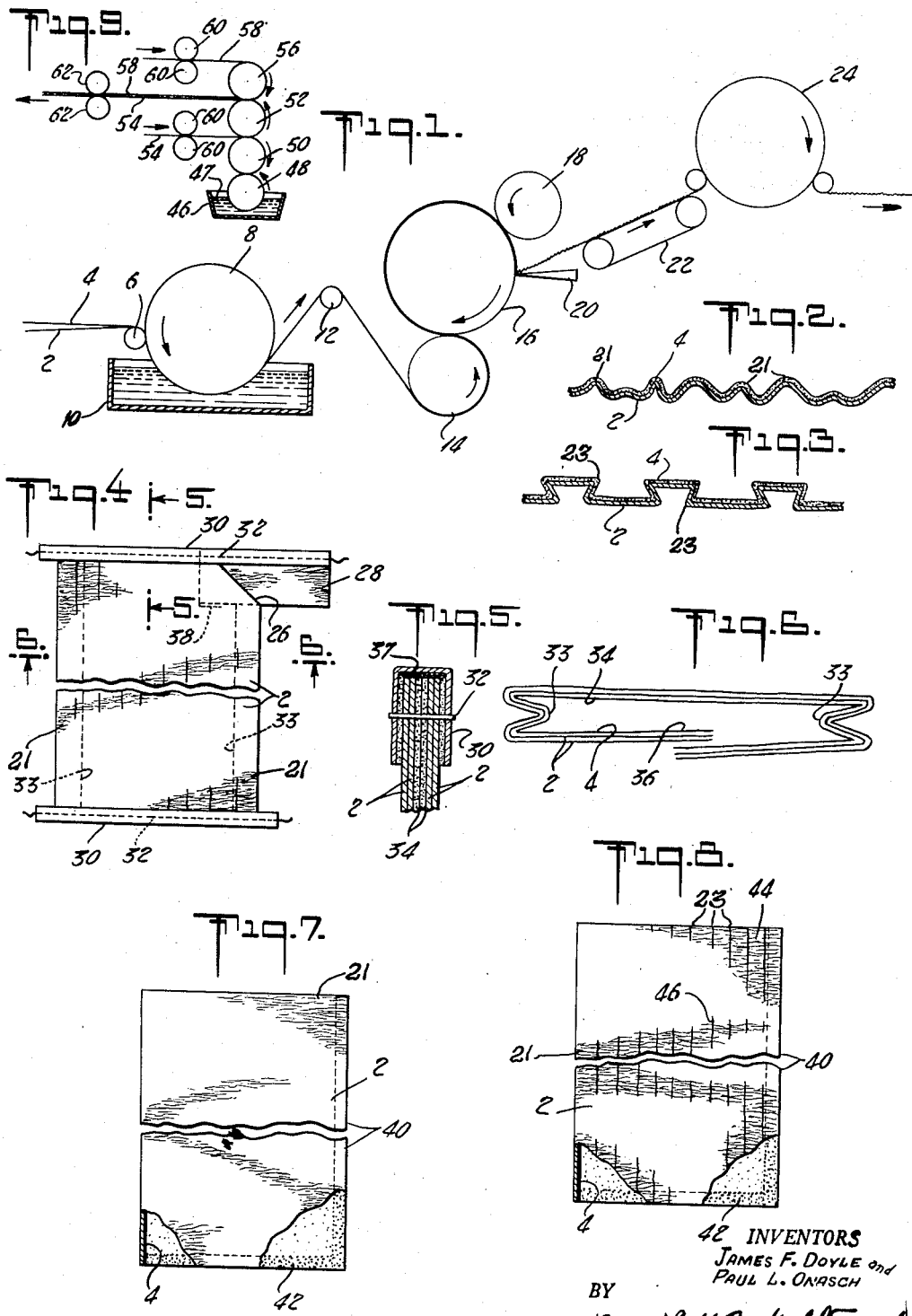

2,679,887

UNITED STATES PATENT OFFICE 2,679,887

METHOD OF MAKING CRINKLED LAMINATED MATERIAL

James F. Doyle, Forest Hills, N. Y., and Paul L. Onasch, Hilton Village, Va., assignors to Arkell Safety Bag Company, New York, N. Y., a corporation of New York Application July 22, 1949, Serial No. 106,194

6 Claims. (Cl. 154—33.05)

The present invention relates to a method of crinkling or creping of paper previously coated with polyethylene resin or laminated with a polyethylene film.

Polyethylene resin possesses properties which particularly adapts it for use in packaging food products, chemicals, etc. It is non-toxic, inert to chemicals at room temperature, resistant to essential oils, has high elasticity and strength, and it possesses excellent water vapor barrier qualities, and resistance to water absorption.

Polyethylene has heretofore been combined with plain paper, either by film casting, namely, extruding the polyethylene first as a film in web form, then adhering it to the paper by means of an adhesive or heat, or both; or by surface coating, namely, coating the resin from solution, emulsion, or hot melt directly on to the paper.

The polyethylene resin either as applied as a film coating, or surface coating in thicknesses varying from about .001 to .003 inch is very susceptible to damage or puncture from hard pointed metallic objects. Also, since it is susceptible to high temperatures, possessing a very sharp softening point at from 226 to 236° F., care must be exercised not to overheat the material.

For these reasons it has been a serious problem to crinkle, and to crinkle and corrugate, a composite web made of paper and polyethylene, either with the polyethylene in the form of a film adhesively secured to the paper web, or as a surface coating.

One of the objects of the present invention is to provide a method of crinkling, and crinkling and corrugating, such composite web of paper and polyethylene without danger of puncturing or otherwise injuring the polyethylene film or coating.

The several features of the invention, whereby these and other objects may be attained, will be readily understood from the following description and accompanying drawings, in which:

Figure 1 is a diagrammatical side view of a crinkling and corrugating machine that may be employed in carrying out our improved method;

Fig. 2 is a sectional view of a portion of a crinkled laminated web of paper and polyethylene made in accordance with the improved method;

Fig. 3 is a similar view of a portion of a crinkled and corrugated laminated web made in accordance with the improved method;

Fig. 4 is a side view of a multi-wall valve bag which may be made of material produced in accordance with the improved method;

Fig. 5 is a detail sectional view, on an enlarged scale, taken on the line 5—5 of Fig. 4;

Fig. 6 is a transverse sectional view, taken on the line 6—6 of Fig. 4;

Figs. 7 and 8 are side views, partly broken away, of linings for bags, barrels and other containers, made from the improved material; and Fig. 9 is a diagrammatical side view of a machine that may be used in forming composite material in accordance with my invention.

In making the crinkled laminated material from a web 2 of paper having a web or film 4 of polyethylene adhesively secured thereto throughout its area either by adhesive or heat, the composite material passes downwardly over an idler 6, beneath a drum 8, which may be driven and of the usual squirrel cage form, extending into a tank 10. This tank may contain water which is heated to a suitable temperature to cause the polyethylene as it passes through the tank to be conditioned so as to be soft and pliable without becoming materially tacky or losing its shape or flowing. To accomplish such conditioning of the polyethylene film, the water should be of a temperature slightly below the critical softening point of the polyethylene. In the case of polyethylene film on the market at the present time the critical softening point thereof is between 219° F. and 239° F., and with such material the temperature of the tank should be from 204° to 210° F. In addition to conditioning the polyethylene, the passage of the composite web through the tank serves to condition the paper in the usual manner for the subsequent crinkling and corrugating operations, the time that the material is subjected to the bath being such as to effect such conditioning of the paper.

For the squirrel cage drum 8, the composite web may pass over an idler 12, beneath a drum or roller 14, and over a crinkling cylinder 16 which may be driven, the paper of the web contacting the cylinder. This cylinder is heated to a suitable temperature to maintain the film in the softened and pliable condition that it leaves the bath 10, the temperature of the cylinder being from about 185° to 200° F.

After passing a substantial distance around this crinkling cylinder, the web is firmly pressed against the cylinder by means of a rubber roller 18 driven at the same surface speed as the cylinder. As the composite web emerges from between the crinkling cylinder and the roller 18, it is acted upon by the usual doctor blade 20 to effect crinkling thereof, the crinkles, which are shown at 21, extending transversely of the web.

It has been found that by first thus conditioning the polyethylene and simultaneously conditioning the paper of the composite web, and presenting the composite web to the crinkling cylinder in the manner described, the crinkling of the web may be effected without danger of puncturing or otherwise injuring the film of polyethylene. When the composite web is dried by any suitable means, it has been found that the web and film are correspondingly and uniformly crinkled, and that it has a remarkable degree of elasticity and strength. The polyethylene, while in the soft and pliable condition described, thus crinkled with the paper minutely and uniformly follow the crinkles in the paper so as to form a unitary laminated structure. In case of imperfections such as pinholes in the polyethylene film they are sealed up, and the film provides an effective protective coating for the paper.

The drying of the crinkled composite web may be effected by passing it through a suitable drier as it leaves the crinkling cylinder and doctor blade.

In case it is desired to corrugate the crinkled web so as to form flattened corrugations 23, it may be passed through a corrugating machine, such as that illustrated and described in the patent to McBean 2,124,582, dated July 26, 1938, the web passing from the crinkling cylinder over a conveyor belt 22 to the corrugating cylinder 24. The cylinder 24 should be heated to a temperature of substantially the temperature of the crinkling cylinder, namely between about 185° and 200° F., so as to maintain the polyethylene film during the corrugating in substantially the heated condition that it leaves the crinkling cylinder.

The composite crinkled-corrugated web thus produced, when dried, is extremely strong and elastic in both directions and will withstand severe bursting strains when the material is used in a container. In addition to providing an effective protective covering the polyethylene serves to cushion both the crinkles and the flattened corrugations in the paper, both during the formation of the corrugations and while the material is in use.

In crinkling, or crinkling and corrugating a composite web in which the polyethylene is coated on the paper as above described, the crinkling may be effected with either the polyethylene or paper exposed to the heated crinkling cylinder and doctor blade. Polyethylene coating is more apt to possess imperfections or pinholes as well as greater non-uniformity of thickness of coating than the separately applied film. However, it has been found that in the case of the coated webs the crinkling operation, while the polyethylene is heated, tends to seal up the imperfections or pinholes and to smooth out any non-uniformity in thickness, especially when the crinkling is performed with the coating in contact with the crinkling cylinder. The temperatures employed in crinkling and corrugating should be substantially the same as the temperatures employed in cases of the film attached web so as to properly condition the polyethylene as above described.

It has been found that polyethylene tends to stretch or elongate without returning to its original position at temperatures of over approximately 190° F. when in the finer gauge, such as .001 to .003 inch. However, owing to the adherence of the film or coating to the paper, such stretching or elongation is effectively resisted even at the temperatures indicated.

In certain instances it may be desirable to provide a crinkled web in which the polyethylene is on both sides of the paper. In such case the polyethylene may be applied either as films or coatings, or a film applied to one side of the paper and a coating to the other side.

My improved composite material is particularly adapted for use for the inner ply of the multiwall bag of Greene Patent 2,314,876, dated March 30, 1943, either provided with an open mouth, or a valve 26 and valve sleeve 28, the ends of the bag tube being closed by tapes 30 and stitches 32. The bag may have side gussets 33 or may be of the non-gusseted type.

When the material is thus used for the inner ply 34 (Figs. 5 and 6) the polyethylene is preferably on the inside and its longitudinal edges 36 may be overlapped and adhesively secured together so as to present only the polyethylene to the contents of the bag. In forming the sewed seams at the ends of the bag tube, the tapes 30 may also be coated on their inner side with polyethylene, preferably with their central portion 37 more heavily coated, and the seam heat-sealed either before or after the application of the stitches 32. By heat-sealing the portion of the tape adjacent the ends of the composite ply, the polyethylene thereon will readily fuse with the edges of the polyethylene film or coating, thus insuring a tight and firm seal at the edges of the several plies of the bag. Also, the polyethylene tends to close the needle holes and provide a secure seal throughout the seam.

The valve sleeve 28 may also be made of the crinkled composite material, with the resin on either one or both sides so as to permit the sleeve to be heat-sealed both at its longitudinal edges and the portion extending into the valve. The inner end 38 of the sleeve may be folded beneath the inner end of the valve flap 28 and adhesively secured thereto. Hence when the bag is thus formed, the entire inner surface thereof that comes in contact with the contents of the bag may consist of polyethylene, either in film or coated form. Also, it is found that due to the elasticity of my improved material, the resistance to stretch and the elasticity of the bags is materially increased.

In forming the lining shown in Fig. 7, the sheet of composite material may be folded upon itself and the longitudinal edges 40 and its bottom edges 42 may be heat-sealed to complete the lining, the crinkles extending preferably transversely of the lining so as to provide for longitudinal stretch.

In the form of lining shown in Fig. 8 in which the material is provided with both transversely extending crinkles 44 and longitudinally extending flattened corrugations 46, the side seam and bottom seam may be formed in a similar manner.

In both forms of lining (Figs. 7 and 8) the polyethylene is preferably on the inside. It will be found that linings thus made not only effectively protect the contents thereof, but also are of great strength and elasticity. Moreover, the smooth although crinkled and corrugated surfaces provided enable the contents of the linings and also the bag to flow freely therefrom during emptying.

Instead of the polyethylene being applied to a single sheet, a composite sheet of paper and polyethylene may be employed in certain instances. In forming such composite material the laminating means illustrated in Fig. 9 of the drawings may be employed.

As shown this means comprises a glue pot or tank 46 to which polyethylene may be supplied in flake or other solid form. The tank 46 is heated so as to melt the polyethylene. Extending into the liquid polyethylene 47 is a roll 48 which contacts with a roll 50 so as to apply the polyethylene to the surface thereof. Between the roll 50 and a roll 52 a web 54 of paper, such as kraft paper, passes, and then passes upwardly over the roll 52. Above the roll 52 is a roll 56 over which a second web of paper 58 passes, the rolls 52 and 56 serving to position the webs in superposed relation. The webs 54 and 58 as they approach the rolls are heated by any suitable means as by heated rolls 60 to a temperature of substantially the melting point of the polyethylene, namely between 220° and 250° Fahrenheit.

With this construction, the roll 50 receiving the coating from the roll 48 serves to uniformly coat the underside of the web 54 with the polyethylene so that when the two webs are brought together between the rolls 52 and 53 the composite material thus produced comprises the two webs with a layer of polyethylene between them. By thus heating the webs 54 and 58 such application of the polyethylene between the webs is accomplished without cooling the polyethylene below its melting point. By adjusting the rolls the film of polyethylene may be made of any desired thickness, preferably between 1 mil. and 2 mils.

After the composite web thus formed leaves the rolls 52 and 56 it passes between chilling or cooling rolls 62 which sets the polyethylene and thus causes the polyethylene to firmly secure the two webs together.

Thus a composite web is formed made up of two webs of kraft or other paper with the layer of polyethylene uniformly applied between them and firmly securing them together.

The composite web may then be fed through a crinkling machine illustrated in Fig. 1, so as to provide transversely extending crinkles. If desired it may also be provided with longitudinally extending corrugations.

The web may then be cut up into composite sheets of which linings for bags or other containers may be made, or they may constitute one or more plies of the bag of the Greene patent above referred to. It is found that this composite sheet is exceptionally strong, and moistureproof, and is particularly adapted for linings and bags.

While the invention is particularly adapted for use in crinkling a composite web comprising a film or coating of polyethylene, it will be understood that it may be employed where the film or coating is made of other resins having the characteristics above described of polyethylene.

What we claim is:

1. The method of making crinkled composite material comprising a web or paper and a film of polyethylene, which comprises adhesively securing the film of polyethylene to one side of a web of paper, passing the composite web through a heated liquid bath to heat the film slightly below the critical softening point thereof and to condition the paper for the subsequent operation of crinkling, passing the composite web when thus treated over a crinkling cylinder with the paper side of the web contacting the cylinder, the cylinder being heated at a temperature to maintain the film at substantially the temperature it leaves the bath, pressing the composite web by means of a roller firmly against the crinkling cylinder, and crinkling the composite web after it passes said roller by means of a doctor blade.

2. The method of making crinkled composite material comprising a web of paper having a layer of polyethylene adhesively secured to one side thereof, which comprises passing the composite web through a heated liquid bath to heat the polyethylene slightly below the critical softening point thereof and to condition the paper for the subsequent operation of crinkling, and crinkling the composite web while maintaining it at substantially the temperature that it leaves said liquid bath.

3. The method of making crinkled composite material comprising a web of paper and a film of polyethylene, which comprises adhesively securing the film of polyethylene to one side of a web of paper, passing the composite web through a heated liquid bath to heat the film slightly below the critical softening point thereof and to condition the paper for the subsequent operation of crinkling, and crinkling the composite web while maintaining it at substantially the temperature it leaves said bath.

4. The method of making crinkled composite material comprising a web of paper having a layer of polyethylene on one side thereof, which comprises passing the composite web through a heated liquid bath to heat the film slightly below the critical softening point thereof and to condition the paper for the subsequent operation of crinkling, passing the composite web when thus treated over a crinkling cylinder with the polyethylene layer contacting the cylinder, the cylinder being heated at a temperature to maintain the layer at substantially the temperature it leaves the bath, and crinkling the composite web on the cylinder by means of a doctor blade.

5. The method of making crinkled and corrugated composite material comprising a web of paper and a film of polyethylene, which comprises adhesively securing the film of polyethylene to one side of a web of paper, passing the composite web through a heated liquid bath to heat the film slightly below the critical softening point thereof and to condition the paper for the subsequent operation of crinkling, passing the composite web when thus treated over a crinkling cylinder with the paper side of the web contacting the cylinder, the cylinder being heated at a temperature to maintain the film at substantially the temperature it leaves the bath, crinkling the composite web on said cylinder, and corrugating the thus crinkled composite web by passing it over a corrugating cylinder while maintaining it at substantially the same temperature and moisture content that it leaves the crinkling cylinder.

6. The method of making a crinkled and corrugated composite material comprising a web of paper and a layer of polyethylene on one side thereof, which comprises passing the composite web through a heated liquid bath to heat the polyethylene slightly below the critical softening point thereof and to condition the paper for the subsequent operation of crinkling, and crinkling the thus treated composite web and then corrugating it.

References Cited in the file of this patent

UNITED STATES PATENTS

| Number | Name | Date |
|---|---|---|
| 1,519,280 | Wandel | Dec. 16, 1924 |
| 1,603,932 | Angier | Oct. 19, 1926 |
| 1,948,138 | Sindler | Feb. 20, 1934 |
| 1,965,719 | Nelson | July 10, 1934 |
| 2,077,438 | Rowe | Apr. 20, 1937 |
| 2,158,754 | Hodgon | May 16, 1939 |
| 2,161,092 | Rowe | June 6, 1939 |
| 2,168,895 | Ames | Aug. 8, 1939 |
| 2,219,700 | Perrin et al. | Oct. 29, 1940 |
| 2,420,212 | Volksdorf | May 6, 1947 |
| 2,430,459 | Farrell et al. | Nov. 11, 1947 |
| 2,434,795 | Glasing et al. | Jan. 20, 1948 |
| 2,522,857 | Butler | Sept. 19, 1950 |